(12) United States Patent
Huang

(10) Patent No.: US 7,436,994 B2
(45) Date of Patent: Oct. 14, 2008

(54) SYSTEM OF USING NEURAL NETWORK TO DISTINGUISH TEXT AND PICTURE IN IMAGES AND METHOD THEREOF

(75) Inventor: Chun-Chia Huang, Taipei (TW)

(73) Assignee: Destiny Technology Corporation, Taipei (TW)

( * ) Notice: Subject to any disclaimer, the term of this patent is extended or adjusted under 35 U.S.C. 154(b) by 930 days.

(21) Appl. No.: 10/868,977

(22) Filed: Jun. 17, 2004

(65) Prior Publication Data

US 2005/0281455 A1    Dec. 22, 2005

(51) Int. Cl.
*G06K 9/62* (2006.01)

(52) U.S. Cl. .................. 382/156; 382/176; 382/157; 382/177; 382/173

(58) Field of Classification Search .............. 382/156, 382/176, 186, 157, 151, 168, 195, 177; 715/863; 725/135; 380/54; 706/49
See application file for complete search history.

(56) References Cited

U.S. PATENT DOCUMENTS

| | | | | |
|---|---|---|---|---|
| 5,608,819 A | * | 3/1997 | Ikeuchi | 382/156 |
| 6,301,381 B1 | * | 10/2001 | Hayashi | 382/156 |
| 6,327,386 B1 | * | 12/2001 | Mao et al. | 382/186 |
| 6,473,522 B1 | * | 10/2002 | Lienhart et al. | 382/168 |
| 7,079,686 B2 | * | 7/2006 | Ahmed et al. | 382/176 |
| 7,263,227 B2 | * | 8/2007 | Simard | 382/195 |
| 2004/0240736 A1 | * | 12/2004 | Karidi et al. | 382/176 |
| 2005/0271277 A1 | * | 12/2005 | Lin et al. | 382/191 |

* cited by examiner

*Primary Examiner*—Matthew C. Bella
*Assistant Examiner*—Ali Bayat
(74) *Attorney, Agent, or Firm*—Harness, Dickey & Pierce, P.L.C.

(57) ABSTRACT

This specification discloses a system of using a neural network to distinguish text and pictures in an image and the method thereof. Using the knowledge of text recognition learned by the neural network in advance, images data of color brightness and gray levels in an image block are processed to generate a greatest text faith value. The system determines the text status of the image block by comparing a text threshold with the greatest text faith value. If the greatest text faith value is larger than the text threshold, then the image block is determined to contain text pixels; otherwise, the image block contains purely picture pixels. This achieves the goal of separating text and pictures in an image.

6 Claims, 4 Drawing Sheets

SYSTEM OF USING NEURAL NETWORK TO DISTINGUISH TEXT AND PICTURE IN IMAGES AND METHOD THEREOF

BACKGROUND OF THE INVENTION

1. Field of Invention

The invention relates to an image data processing technique and, in particular, to an image processing technique that uses a neural network to recognize text pixels and picture pixels in an image, thereby achieving the goal of text/picture separation.

2. Related Art

The multi-function peripheral (MFP) is an image processing device that combines such functions as scanning, copying, and printing. Since it integrates various kinds of useful functions in one machine, it gradually becomes one of the most favorite products on the market. In particular, the copy function of the MFP actually combines the functions of scanning and printing. For example, in the copy mode, the scanning function is initiated. Its charge coupled device (CCD) scans a document to obtain image data. Afterwards, the print function is initiated to print the scanned image data in ink (carbon powders).

Since the RGB color correction of the CCD is not sensitive to the edges of black text, it has to mix ink of the CMY colors when printing the black text. This does not only waste color ink, but also slows down the printing speed because it has to mix ink of the three colors to print the black text. Moreover, the quality is not satisfactory; black text often becomes color text.

The image data of a document usually contains the text and picture parts. In order to have a better visual or output effect, the image data has to be blurred. However, blurring the whole image will deteriorate the text quality. Therefore, it would be desirable to separate the text and picture parts in the image. One can then blur the picture part, and may further perform edge enhancement in the text part. When printing the document, one can use only the black ink (or carbon powders) for the text part. This can save the ink (carbon) cost and increase the printing speed. The printing quality of the black text also becomes better.

There are many techniques for separating text and pictures in an image. However, most techniques have to convert the image data to use the coordinate system in the frequency domain. This requires the use of complicated hardware, and thus a higher cost. The method of using a neural network technique to separate text and pictures in image data can process data in the coordinate system of the spatial domain, without converting to the frequency domain.

Nonetheless, the neural network technique for separating text and pictures in an image proposed in the prior art has to perform a preparation step of characteristic quantization. Each variable (input value of the neural network) in the image data has to be pre-processed in order for the neural network to process image data, then determining which type (text, picture or noise) the image data belongs to.

According to the prior art, the technique of separating text and pictures in an image has to pre-process the image data and has to use two (or more than two) different devices to process image data. Under the consideration of speed and memory, the prior is obvious not suitable for the MFP.

SUMMARY OF THE INVENTION

In view of the foregoing, the invention provides a neural network technique that simulates human vision for processing image data and recognizing text and picture pixels. This method does not require the preparation step of characteristic quantization, nor does it need the use of different devices for image processing. An embodiment of the invention is to train the neural network in advance for it to obtain the knowledge of text recognition. Therefore, the invention is able to separate text pixels from the picture pixels in the image.

To achieve the above objective, the disclosed system has an image block division module, a neural network module, and a text determination module.

The image block division module extracts gray-level data from the image and divides the gray-level data into several image blocks. Each image block has several block columns, each of which is comprised of several continuous pixels.

The neural network module uses the text recognition knowledge to process the continuous pixels in the block columns, obtaining text faith values and then obtain a greatest text faith value in each image block.

The text determination module compares a text threshold with the greatest text faith value to determine the text status of the image block. If the greatest text faith value is larger than the text threshold, the image block is determined to have text pixels; otherwise, the whole image block is determined to have only picture pixels.

On the other hand, the disclosed method of using a neural network to distinguish text and pictures in an image contains the steps of: extracting gray-level data related to color brightness in an image and dividing the gray-level data into a plurality of image blocks, each of which has a plurality of columns made of a plurality of continuous pixels; entering the gray-level values of the continuous pixels in a column and using the text recognition knowledge learned by the neural network in advance to process the continuous pixels, obtaining text faith values and a greatest text faith value; comparing the greatest text faith value and a text threshold to determine the text status of the image block, the image block being determined to contain text if the greatest text faith value is larger than the text threshold and pictures otherwise.

BRIEF DESCRIPTION OF THE DRAWINGS

The invention will become more fully understood from the detailed description given herein below illustration only, and thus are not limitative of the present invention, and wherein.

DETAILED DESCRIPTION OF THE INVENTION

Figure 1:
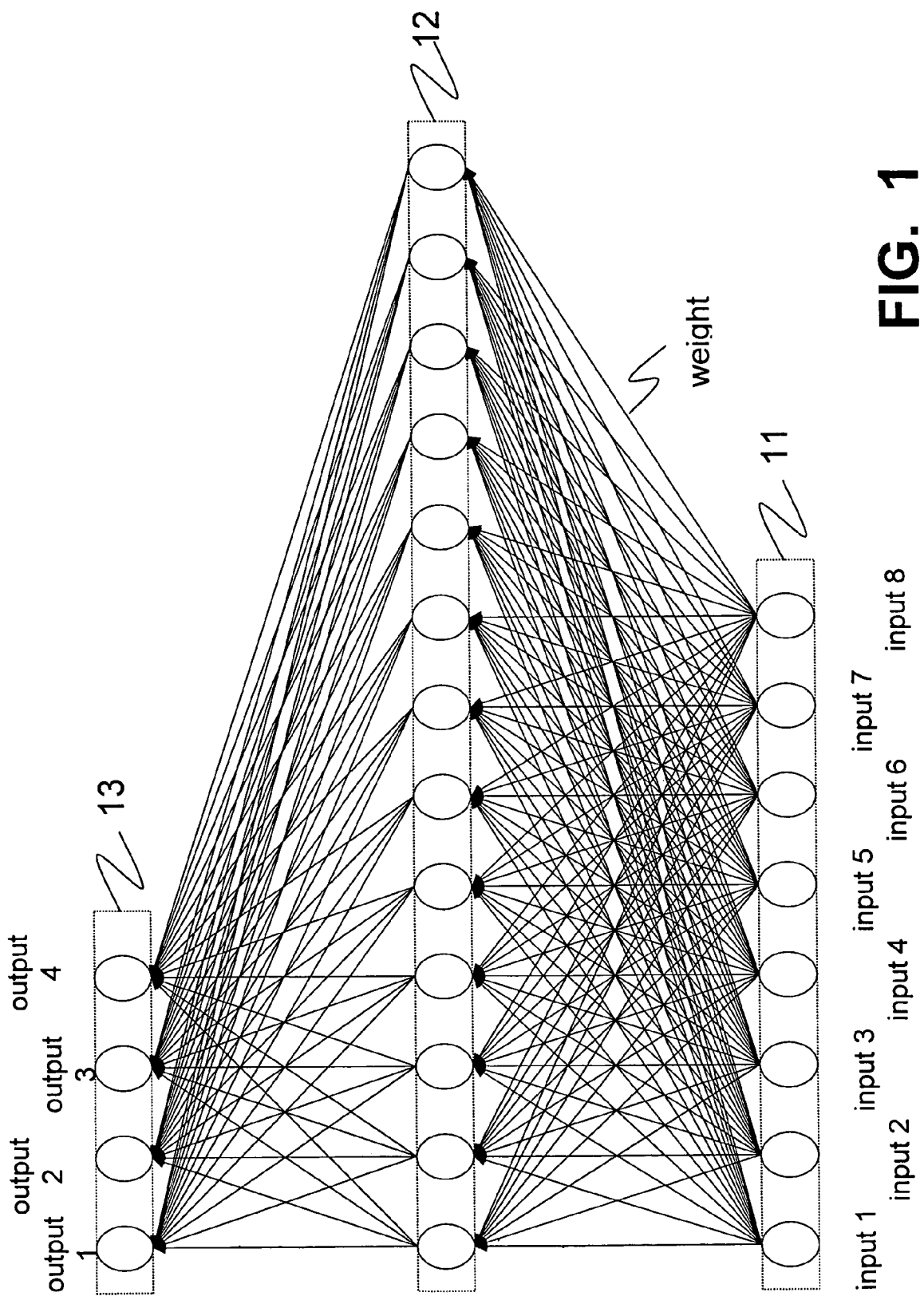
FIG. 1 is a neural network structural diagram of the disclosed system of using a neural network to distinguish text and pictures in an image.

Before explaining the disclosed system and method, we first introduce the basic neural network structure. As shown in FIG. 1, the neural network contains an input layer 11, a hidden layer 12, and an output layer 13. The input layer 11 has many neurons (8 points) for entering data to be processed (such as the gray levels of pixels). The hidden layer 12 has many neurons (13 points) to temporarily storing the processing result. The output layer 13 has many neurons (4 points) to output the output values processed by the neural network. Each neuron in the input layer 11 and each neuron in the hidden layer 12 have a connection with a weight. Likewise, each neuron in the hidden layer 12 and each neuron in the output layer 13 have a connection with a weight. The weights in the above-mentioned connections are obtained after training the neural network, becoming the knowledge of the neural network. Moreover, the neural network can have more than one hidden layer 12.

Before use, the neural network has to go through the training, testing, and running steps. During the training step, appropriate training data are fed to the neural network. Each set of training data is comprised of the gray levels of several pixels (corresponding to the neurons in the input layer 11) and several output data (corresponding to the neurons in the output layer 13). Through the training step, each connection in the neural network obtains a weight, recording the knowledge thus learned. During the testing step, the gray levels of the pixels are fed to the neural network as the training data. It further checks whether the output data of the neural network are close to the output data of the training data. If they are close, then it means that the neural network is trained well enough, each connection having an appropriate weight. If they differ too much, the neural network has to be trained again. In the running step, the neural network is fed with unknown test data to observe whether the output values of the neural network are correct (close to expectation). If they are correct, it means that the neural network is stable and has obtained the text recognition knowledge; otherwise, the neural network has to be trained again.

In order for the neural network to obtain the text recognition knowledge, appropriate training data have to be used. The training data include image data in the following forms: photo-to-text data, white-to-text data, text-to-photo/white data, text-to-text data, no text data, data of text with more than one edge, and data of text with halftoning noise. Following the above-mentioned learning step, testing step, and running step, the neural network obtains the text recognition knowledge from the variation of various kinds of image data.

The image data for training the neural network are the gray levels of the color brightness of the image. The input values of the neural network are the gray levels of pixels (such as 165, 181, 173, 148, 82, 90, 74, and 82). The gray levels are between 0 and 255. The larger the gray level is, the closer it is to white. The smaller the gray level is, the closer it is to black. Generally speaking, the gray level values of black text pixels are smaller. The invention uses this property to find text pixels. Such training data are fed to the neural network for it to learn the text recognition knowledge. Using the text recognition knowledge, the neural network is able to distinguish text pixels from picture pixels from the gray level values of continuous pixels.

The neural network with the text recognition knowledge has several output data, including a text faith value, an edge confidence value, a text direction value, and an edge position value (e.g. the output data of the previous example are 0.7, 095, 1, and 5, respectively). The text faith value means the possibility of a text pixel to show up. The edge confidence value means the possibility of a text edge to show up. If the text pixel appears to the right of input value, the text direction value is 1. If the text pixel appears to the left of input value, the text direction value is 2. Otherwise, the text direction value is 3. The edge position value tells at which pixel (from 1 to 8) the text edge (where the gray level value changes abruptly) appears in the input pixels.

Figure 2:
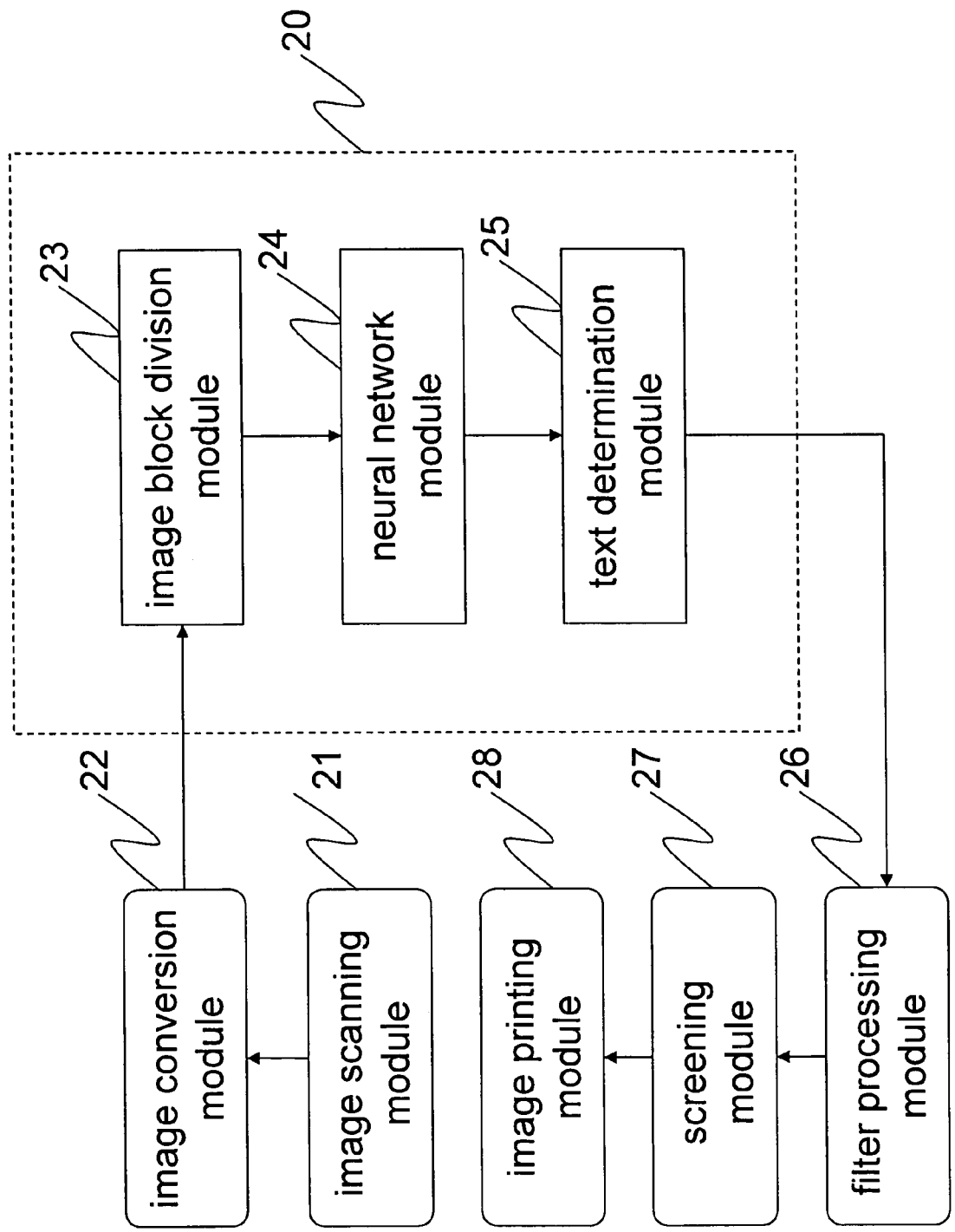
FIG. 2 is a system block diagram of FIG. 1.

FIG. 2 shows a preferred embodiment of the invention that takes the MFP as an example. First, an image scanning module 21 scans an image to obtain image data (e.g. RGB image data). An image conversion module 22 converts the RGB image data into YCC image data. The neural network system 20 of the invention processes image data of color brightness in order to separate text and picture in the image. The neural network system 20 contains an image block division module 23. The gray level image data are divided into several image blocks. Each image block has several block columns, each of which is comprised of several continuous pixels. The pixel is also the basic processing unit of the neural network module 24. After the neural network module 24 of the neural network system 20 receives data of the continuous pixels in the block column, it uses the text recognition knowledge learned in advance from the learning data to process the pixel data, generating text faith values. Once all the block columns are processed, several text faith values are obtained, including a greatest text faith value (the maximum of all the text faith values). The text determination module 25 of the neural network system 20 compares a text threshold and the greatest text faith value. If the latter is larger than the former, the image block is determined to contain text pixels; otherwise, the whole image block is determined to contain only picture pixels. After the text and pictures in the image are separated, a filter processing module 26 is applied to these two types of image block. The pixels in the text block are processed with edge enhancement filter while the pixels in the picture block are processed with smoothing filter. After the filter processing of image block, a screening module 27 is applied to the image block to come out the half-toning image for printing. In the last stage, the image printing module 28 uses black ink (carbon powders) to print the text pixel part, saving the printing cost and increasing the printing quality.

Figure 3:
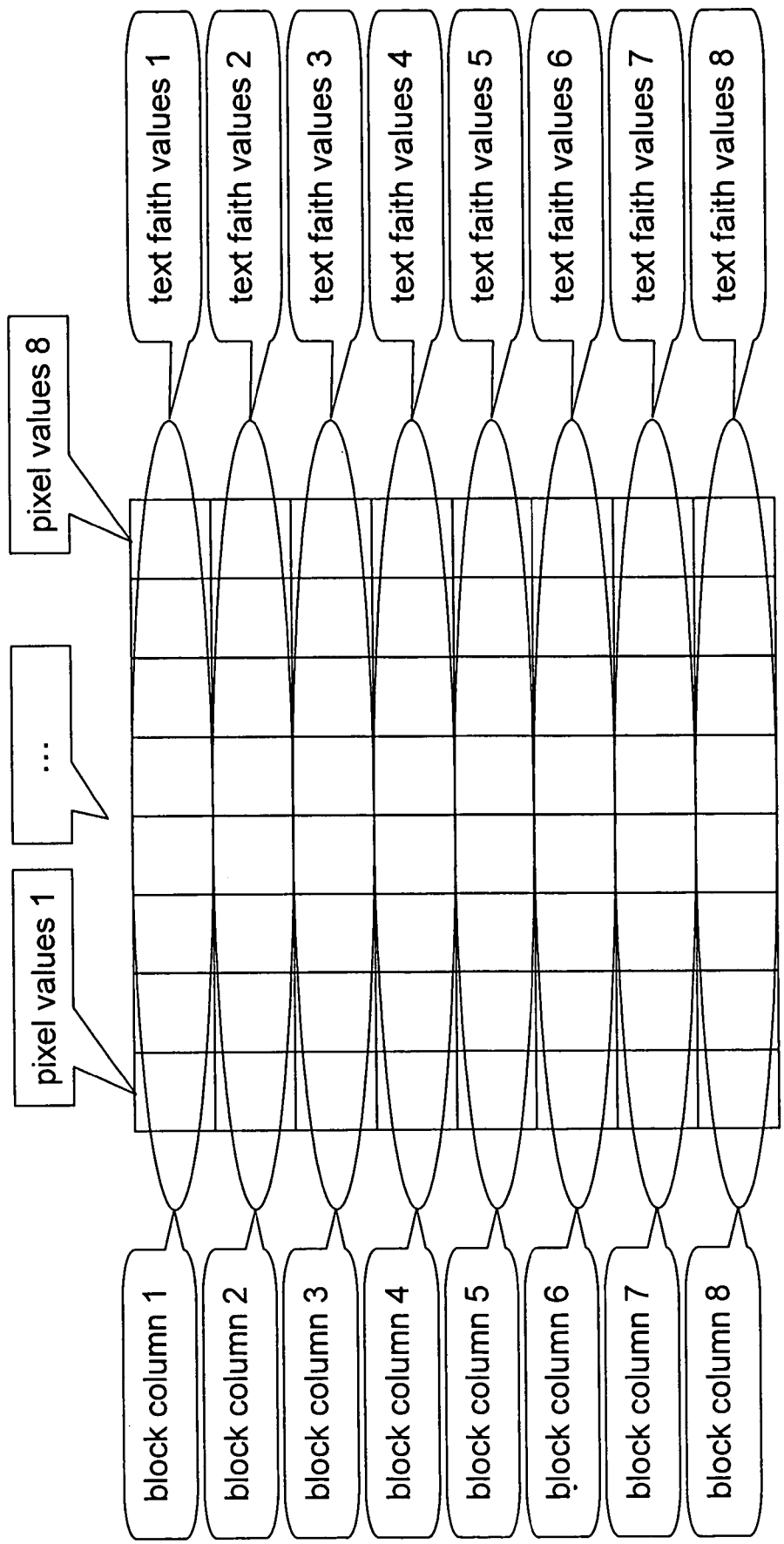
FIG. 3 is a schematic view of the image block according to the disclosed system and method of using a neural network to distinguish text and pictures in an image.

As shown in FIG. 3, the image block is comprised of eight block columns (block column 1 to block column 8), and each block column is made of eight pixels. Since the image data to be processed are gray-level data of color brightness, the pixel values are thus the gray-level values of the image (pixel value 1 to pixel value 8). The basic unit processed by the neural network is a block column (corresponding to the input layer 11). Using the text recognition knowledge of the neural network, several text faith values are obtained (corresponding to the output layer 13). When the eight block columns of an image block are all processed, eight text faith values are obtained (text faith value 1 to text faith value 8). The largest text faith value is called the greatest text faith value.

Figure 4:
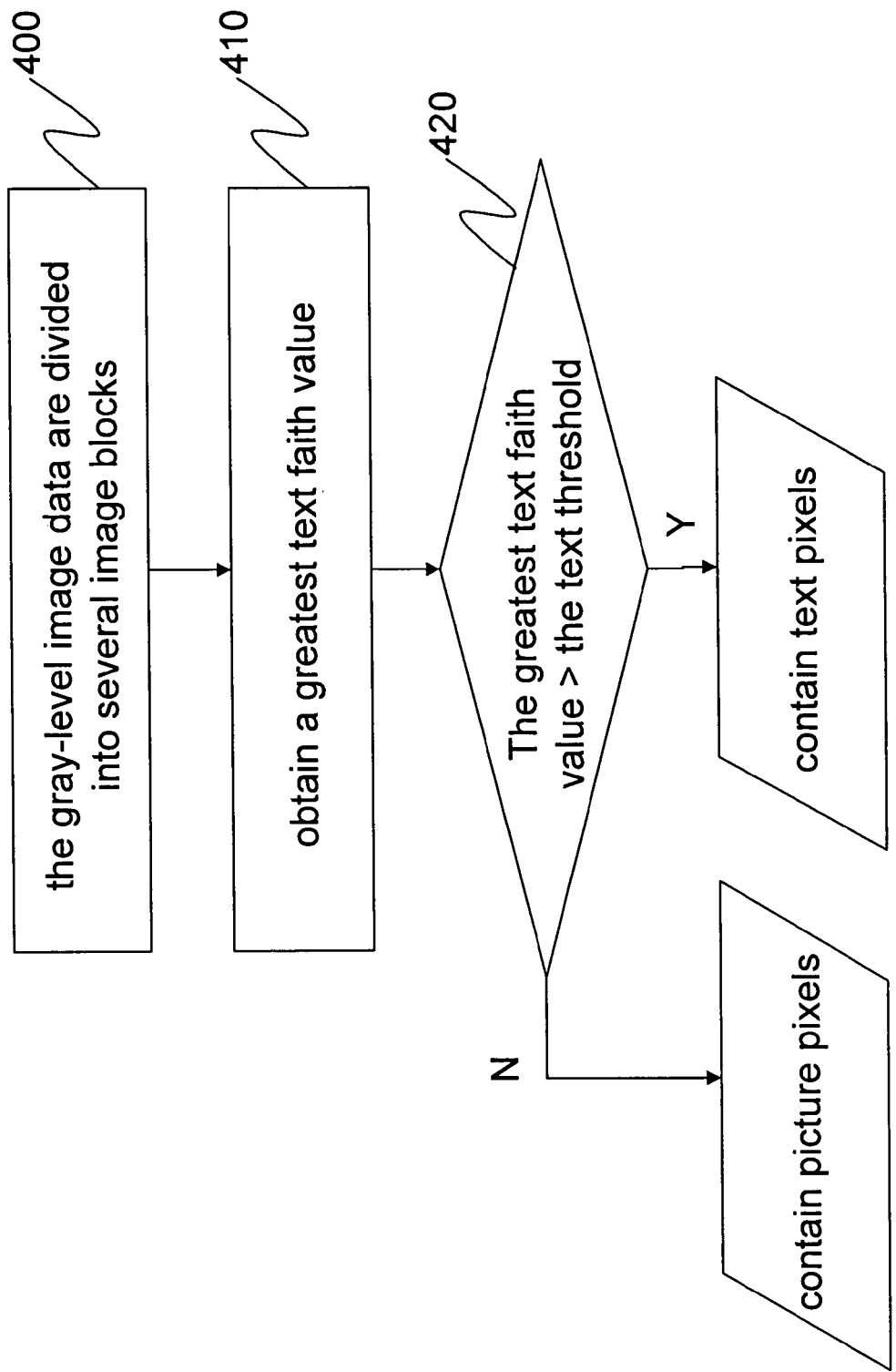
FIG. 4 is a flowchart of the disclosed method of using a neural network to distinguish text and pictures in an image.

As shown in FIG. 4, the disclosed method of using a neural network to distinguish text and pictures in an image has the following steps. First, the gray-level image data are divided into several image blocks, each of which has several block columns (e.g. eight block columns). Each block column consists of several continuous pixels (e.g. eight pixels) (step 400). The gray level values of the pixels are processed using the text recognition knowledge of the neural network to obtain text faith values and a greatest text faith value (the maximum of all the text faith values) (step 410). The text status of the image block is determined according to the result of comparing the text threshold and the greatest text faith value (step 420). If the greatest text faith value is larger than the text threshold, then the image block is determined to contain text pixels; otherwise, the image block is determined to have only picture pixels.

Certain variations would be apparent to those skilled in the art, which variations are considered within the spirit and scope of the claimed invention.

What is claimed is:

1. A system of using a neural network to distinguish text and pictures in an image, a set of training data being used to train the neural network in advance to generate text recognition knowledge, the system comprising:

an image block division module, which extracts gray-level image data of the image and divides the gray-level image data into a plurality of image blocks, each of which contains a plurality of block columns each of which is made of a plurality of continuous pixels;

a neural network module, which uses the text recognition knowledge to process the continuous pixels of the block column, generating a text faith value for each of the pixels and obtaining a greatest text faith value; and a text determination module, which compares a text threshold with the greatest text faith value to determine the status of the image block, wherein the training data include photo-to-text data, white-to-text data, text-to-photo/white data, text-to-text data, no text data, data of text with more than one edge, and data of text with halftoning noise.

2. The system of claim 1, wherein the greatest text faith value is the maximum of the text faith values of the block column of the image block.

3. The system of claim 1, wherein the image block is determined to contain text pixels if the greatest text faith value is larger than the text threshold and to contain only picture pixels otherwise.

4. A method of using a neural network to distinguish text and pictures in an image, a set of training data being used to train the neural network in advance to generate text recognition knowledge, the system comprising:

extracting gray-level image data of an image and dividing the gray-level image data into a plurality of image blocks, each of which contains a plurality of block columns each of which is made of a plurality of continuous pixels;

inputting the gray levels of the continuous pixels of the block column, using the text recognition knowledge to process the continuous pixels to generate a text faith value of each of the block column and to obtain a greatest text faith value; and determining the text status of the image block according to the result of comparing a text threshold and the greatest text faith value, wherein the training data include photo-to-text data, white-to-text data, text-to-photo/white data, text-to-text data, no text data, data of text with more than one edge, and data of text with halftoning noise.

5. The method of claim 4, wherein the greatest text faith value is the maximum of the text faith values of the block column of the image block.

6. The method of claim 4, wherein the image block is determined to contain text pixels if the greatest text faith value is larger than the text threshold and to contain only picture pixels otherwise.

* * * * *